United States Patent [19]

Zagotta

[11] 4,122,867
[45] Oct. 31, 1978

[54] HYDRAULIC VALVE WITH OPEN CENTER METERING NOTCHES

[75] Inventor: Joseph L. Zagotta, Chicago, Ill.

[73] Assignee: International Harvester Company, Chicago, Ill.

[21] Appl. No.: 805,245

[22] Filed: Jun. 9, 1977

Related U.S. Application Data

[63] Continuation of Ser. No. 538,685, Jan. 6, 1975, abandoned, and Ser. No. 365,648, May 31, 1973, abandoned.

[51] Int. Cl.² ............................................. F16K 47/04
[52] U.S. Cl. ................................. 137/625.3; 91/418; 137/625.69; 251/205
[58] Field of Search .................... 91/418, 462, 466; 137/625.3, 625.69, 596.12, 596.13; 251/205; 138/46

[56] References Cited

U.S. PATENT DOCUMENTS

| | | | |
|---|---|---|---|
| 2,783,745 | 3/1957 | Stephens | 137/625.69 |
| 2,856,960 | 10/1958 | Stacey | 137/625.69 X |
| 2,971,536 | 2/1961 | Junck et al. | 91/466 X |
| 2,989,067 | 6/1961 | Perle | 251/205 X |
| 3,123,335 | 3/1964 | Darling | 251/282 |
| 3,160,174 | 12/1964 | Schmiel et al. | 137/625.69 X |
| 3,198,212 | 8/1965 | Junck et al. | 137/625.69 X |
| 3,765,454 | 10/1963 | Carl | 137/625.3 X |

FOREIGN PATENT DOCUMENTS

624,616  6/1949  United Kingdom ............ 137/625.3

*Primary Examiner*—Irwin C. Cohen
*Attorney, Agent, or Firm*—Raymond E. Parks; Frederick J. Krubel; F. David AuBuchon

[57] ABSTRACT

Assembly wherein the axial open center flow forces are reduced by a notch having low pressure generating section. The fluid stream is bent by the existence of the low pressure to exit at an angle approaching 90°.

10 Claims, 5 Drawing Figures

HYDRAULIC VALVE WITH OPEN CENTER METERING NOTCHES

This is a continuation of application Ser. No. 365,648, filed May 31, 1973, and of application Ser. No. 538,685, filed Jan. 6, 1975, both abandoned.

This invention relates to a hydraulic power transmitting apparatus and more particularly to the metering notches in the spool of the hydraulic valve which direct the flow of high pressure fluid to minimize axial steady state flow forces.

The assembly of the present invention generally comprises a plurality of pressure fluid actuated rotary or linear motor devices, control valves, pressure fluid conduit means connecting a source of pressure fluid with the control valves, exhaust conduit means connecting the control valves with a fluid dump, and a line series connecting each of the plurality of motor devices with the control valves. The control valve itself includes a body portion having a bore therein, a cavity in the valve body bore communicating through a port with the respective line for each motion. a pressure fluid plenum, chamber in the valve body communicating with the pressure fluid conduit means and with each of the valve body cavities, an exhaust fluid plenum chamber in the valve body communicating with the exhaust conduit means and with each of the valve body cavities, a signal spool means slidable in the main valve body bore and spaced lands on the spool means cooperating with lands in the valve body bore for opening the flow of pressure fluid from the pressure fluid plenum chamber to selected pairs of cavities. This is achieved for maintaining the flow of exhaust pressure fluid between the other cavities and the exhaust plenum chamber and also for selectively blocking the flow of fluid from the pressure fluid plenum to the valve body cavities and opening communication between the valve body cavities and the exhaust the plenum chamber.

The spool as it passes through a work cycle is subjected to various forces of both a radial and axial nature. For the most part, due to the symmetric construction of the spool, the radial forces balance out thereby they do not influence spool actuation. The axial forces, however, produced as a result of fluid momentum change are not so easily disposed of as evidenced by the prior art. i.e. Miller U.S. Pat. No. 3,009,480 and Hodgson U.S. Pat. No. Re. 24,580. Additionally, reference should be made to pending application Ser. No. 761,758, filed on Jan. 24, 1977, which is a continuation-in-part of application Ser. No. 365,649, filed on May 31, 1973.

The axial forces that operate on a valve spool include the inertial force, which is readily calculated and usually small, frictional forces, which are not accurately calculable but which should also be small on a properly designed and properly applied valve, and various forces which owe their existence to the fact that fluid is flowing through the valve exerting axial forces on the spool. These last mentioned forces are known as flow forces, the origin of which can be most easily understood from a brief explanation. The lands of the spool in combination with those in the valve bore create variable metering orifices in the upstream and downstream fluid carrying chambers. Only one set of lands restricting the fluid flow either as it opens or closes. It is this act which is responsible for generating fluid flow forces when both of these sets of lands are normally open the fluid velocity generated is minimal. More specifically, the angle at which the fluid stream exits between the lands is the critical component. That is as the angle approaches 90° the axial forces approach 0.

In accordance with this invention a hydraulic power transmitting apparatus is provided and includes: a hydraulic control valve, a hydraulic motor and a source of fluid pressure. The hydraulic valve controls the direction of fluid flow by means of a shiftable spool means which opens and closes outlets and inlets according to a predetermined timing. In order to decrease the generation of open center flow forces the open center lands of the spool provided with metering and notch means having low pressure generating volumes tend to turn the exiting of fluid jet to angles near 90°.

It is therefore an object of this invention to provide a hydraulic valve spool having an open center metering notch which in combination with a high velocity fluid flow provides a low pressure sink volume.

Yet another object of this invention is to provide an open center metering notch which directs the exiting fluid stream to angles near 90°.

Other objects and advantages of the invention will become apparent upon reading the following detailed description and upon reference to the drawings, in which:

FIG. 1, is a cut view of a control valve with the associated motor and high pressure fluid source;

FIG. 2, is a view of the spool showing the metering notch means and their location;

FIGS 3a and 3b illustrate two embodiments of a low pressure sink means; and

FIG. 4, is a theoretical view showing flow paths and low pressure areas.

BRIEF DESCRIPTION OF THE DRAWINGS

Referring now to the drawings and in particular to FIG. 1, wherein is shown a hydraulic power transmitting means 10, including a fluid pump means 12, a hydraulic control valve 14 and a hydraulic cylinder or motor means 16. The hydraulic pump means 12 and the hydraulic cylinder means 16, as well as the conduit means interconnecting the related components are all standard items well known in the art and therefore no further discussion will be devoted thereto. The hydraulic control means 14 includes: a body means 18, work ports 20 and 22, high pressure inlet port 24, a bore means of a uniform diameter 26 and having a spool means 28 reciprocating therein, as well as a series of chaneling means which will be fully explained hereafter. The fluid passage of channel means whereby high pressure fluid is directed to the desired side of hydraulic cylinder means 16 and simultaneously directed to dump from the opposite side fluid motor 16 includes: annular chamber means 30 and 32 supply pressure source chamber 34, cross over passage 36, first port channel means 38, second port channel means 40, and first and second dump passages 42 and 44. It should be noted that first and second dump passages or chambers 42 and 44 in the normal practice contain additional means such as anti-cavitation devices, or relief valves. Any of these can be used in combination in this valve. It will be understood that means of 46 and of 48 under normal circumstances prevent the passage of high pressure fluid from respectively chamber 38 to dump chamber 42 and from dump chamber 40 to dump chamber 44.

Referring more specifically to a bore means 26 and spool means 28 wherein is more clearly embodied the invention of this application. The axial flow forces involved during the work cycle of spool means 28 can be divided into two groups; the open center and the tandem center flow forces. A more thorough discussion of these forces can be found in co-pending application Ser. No. 761,758, filed on Jan. 24, 1977, which is a continuation-in-part of application Ser. No. 365,649, filed on May 31, 1973. The discussion herein will be limited to the open center flow forces which originate in area 50 of spool means 28 which is also provided with a series of open center land means 56. A second land series 58 and 60 are separated by narrow section or shank means 62 and 64 from first land means 56. The annular chamber means 30, 32, and 34 as previously discussed are separated by a series of fixed land means 66 and 68. More specifically, the annular chamber 30 and 32, which encircle the bore, are separated from high pressure chamber means 34 by the fixed seat land means 66 and 68.

Figure 1:
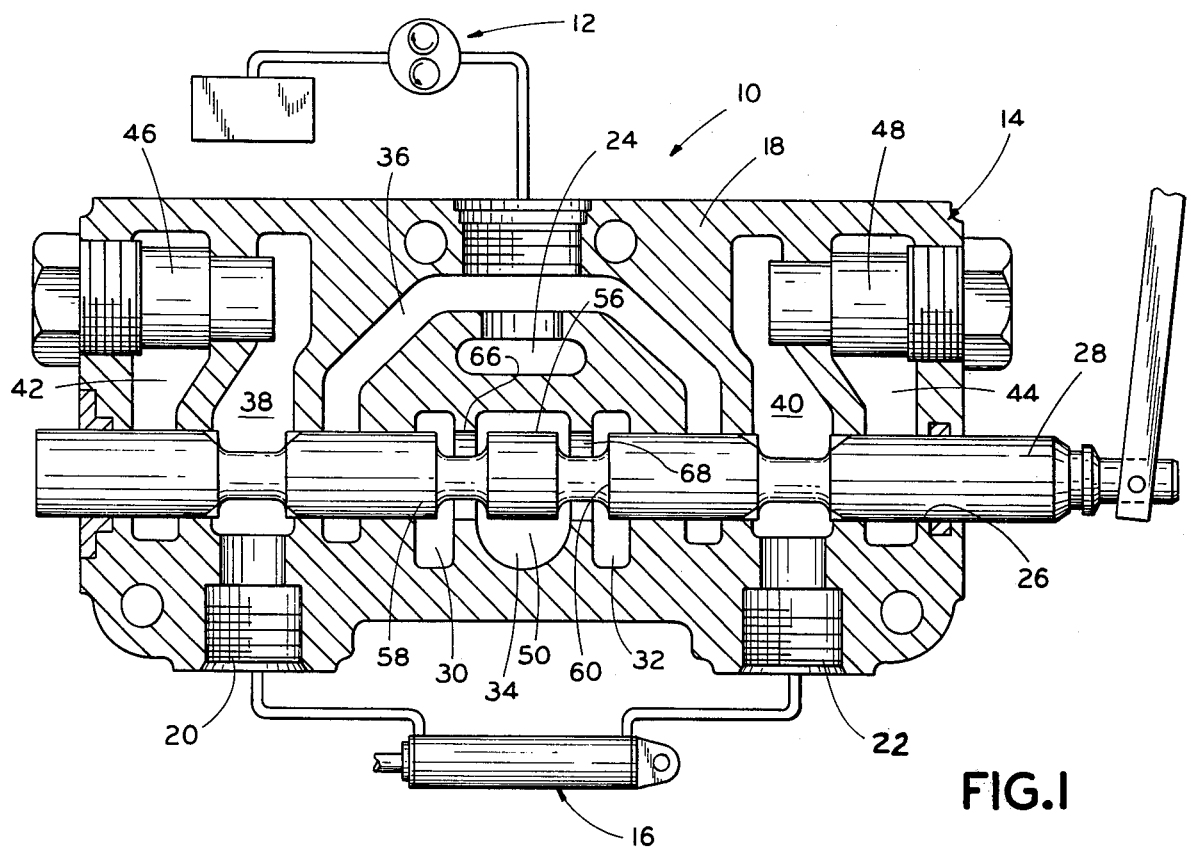
Figure 2:
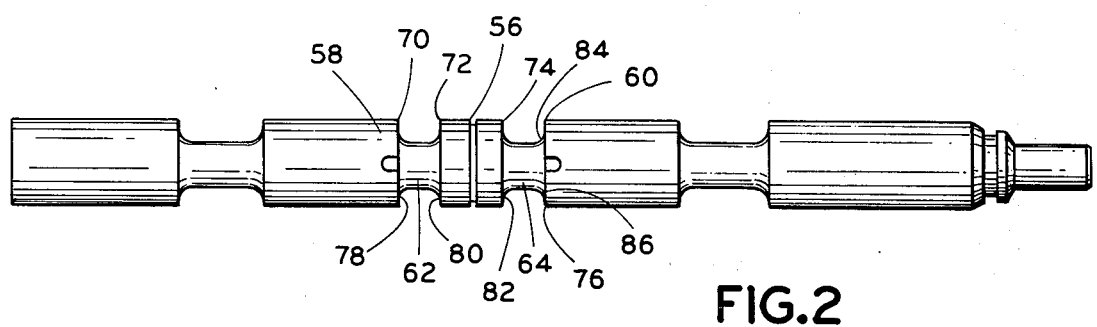
Referring now to FIG. 2, wherein is shown spool means 28 and the spool land means. Each of the open center spool land means has a control or land edge means which include edge means 70, 72, 74, and 76. The respective land edge means being separated from the neck down region or shank means 62 and 64 by the face means 78, 80, 82, and 84, and a small radius fillet such as 86 at the junction with the shank means. The shank means 82 and 84 form a second diameter portion parallel to the major axis of the spool means 28 as is apparent upon movement of the spool either to the right or the left, the respective control edges of the fixed land means and the spool land means become adjacent to each other such that a high pressure fluid seal is achieved.
Figures 3A, 3B:
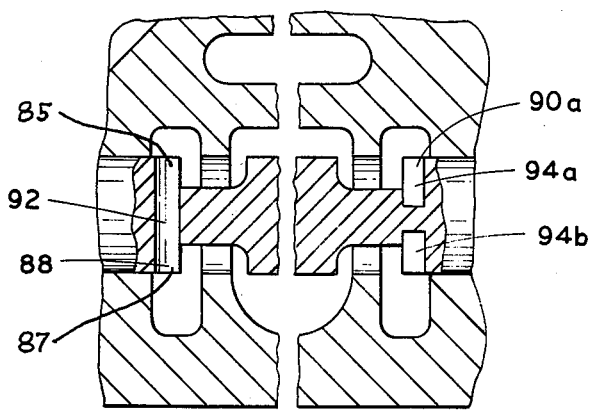
Referring now to FIG. 3, wherein is shown two embodiments of the present invention. The particular arrangement of the two types of open center notch means 88 and 90a and 90b in regard to which land or series of spool lands they are formed in, depends on choice and as shown both embodiments are cut in lands 58 and 60. However, it should be understood that the open center notch means could be provided in land means 56 as well. Reference for the sake of explanation will be made to metering notch 90a, also shown in FIG. 4 but this discussion applies to notch means 88 as well. The metering notch means 90a intersects the control edge 56 and the face means 86 cutting away a portion of each, the result being as leading edge means 76 approaches fixed seat land 68 a variable orifice is created therebetween. As high pressure fluid is thereafter diverted through notch means 90a it creates low pressure sink or cul-de-sac means 94a and 94b.
Figure 4:
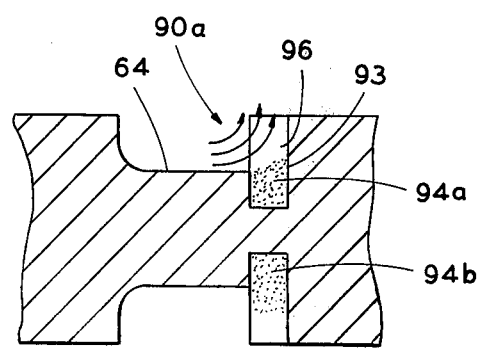

As the fluid flow velocity increases with the narrowing of the variable orifice the rush of fluid past the low pressure sink 94a causes a lowering of the pressure therein. The pressure differential is sufficient to cause a bending of the fluid flow such that it tends to conform to the adjacent surface means 93 and exits from metering notch means 90a at an angle substantial perpendicular to the major axis of the spool means 28. The low pressure sink and the bending of the fluid flow are more clearly shown in FIG. 4. The metering notch means 90a for example includes a cavity section 96, which intersects the edge means and the face means of land means 80, and the low pressure sink means 94a. In this embodiment cavity section means 96 extends generally perpendicular into the spool although it is apparent that it could be set at angles thereto. Low pressure sink area means 94a is in a complementary relationship with cavity means 96 and extends generally downwardly below the level of shank means 64. In general low pressure sink means 94a includes a chamber having a series of side means one of said side means being broken away and exposed to a high speed flow of fluid.

A slight variation is shown in open center notch means 88 wherein the notch itself extends through spool means 28. A low pressure sink area means 92 is created and maintained by virtue of the flow of high speed fluid through cavity means 85 and 87. The flow at both cavity sections having the same characteristics exerts the same forces causing low pressure sink means 92 to remain substantially centered.

As is apparent, tests of the particular hydraulic valve will determine the exact nature of the open center metering notches and therefore the exact nature of the low pressure sink means. The critical feature of the open center notch means of this invention being the provision of the low pressure sink area and therefore not particularly dependent upon the overall notch configuration or location.

Thus it is apparent that there has been provided, in accordance with the invention, a metering notch that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of appended claims.

What is claimed is:

1. In a control valve comprising a valve body having a circular bore, a spool reciprocable along its longitudinal axis within the circular bore, the circular bore having an enlarged diameter portion forming a bore land, the spool having a reduced diameter portion forming a cylindrical spool land, the spool land having a flat radial surface adjacent the reduced diameter portion for controlling fluid flow passing across the bore land upon movement of the spool land in opposite axial directions to and from the bore land, means forming a throttling slot in the spool land, the throttling slot having a wall portion axially spaced from the flat radial surface of the spool land and extending radially outwardly from the reduced diameter portion to the cylindrical peripheral surface of the spool land, the throttling slot including a cavity means formed in the spool land extending radially inwardly from the reduced diameter portion toward the longitudinal axis of the spool, the cavity means having a first wall surface disposed axially from the flat radial surface of the spool land and extending perpendicular relative to the longitudinal axis of the spool, the cavity means further having a second wall surface extending perpendicular to the longitudinal axis of the spool and axially spaced from the first wall surface, the first and second wall surfaces parallel to and coinciding respectively with the wall portion of the throttling slot and the flat radial surface of the spool land.

2. The combination of claim 1, wherein two throttling slots and cavity means are provided one each at diametrical opposite locations on the spool land and wherein the first and second wall surfaces of each cavity means terminate and form closed ended pockets on diametrical opposite sides of the longitudinal axis of the spool.

3. The combination of claim 1, wherein two throttling slots are provided one each at diametrical opposite locations on the spool land and wherein the first and second wall surfaces of the cavity means extend to the two throttling slots through the longitudinal axis of the spool.

4. A fluid flow control valve having fluid inlet and exit chambers separated by a wall member, the wall member having a circular bore communicating the inlet and exit chambers and forming a sleeve land, a valve member slidably carried in the bore and having an annular groove forming a cylindrical piston land, the piston land having a radially flat control edge adjacent the annular groove cooperating with the sleeve land and forming a variable orifice as the piston land is axially shifted along a longitudinal axis into the sleeve land, the control edge having an axially directed generally U-shaped fluid metering notch extending radially between the annular groove and the circumference of the piston land permitting a decreasing restrictive fluid flow from the inlet chamber past the sleeve land into the exit chamber as the control edge is axially shifted deeper into the sleeve land, a cavity means in the spool extending radially inwardly of the annular groove and having a first wall perpendicular to said longitudinal axis and being axially spaced remote from the control edge and coinciding with the curved wall of the U-shaped notch and having a second wall perpendicular to said longitudinal axis and axially spaced from and parallel to the first wall and coinciding with the flat control edge of the piston land.

5. The invention as claimed in claim 4, wherein two U-shaped notches and cavity means are provided one each at diametrical opposite locations on the piston land and wherein the first and second walls of each cavity means terminate into closed ended pockets on opposite sides of the longitudinal axis.

6. The invention as claimed in claim 4, wherein two U-shaped notches are provided one each at diametrical opposite locations on the piston land and wherein the first and second walls of the cavity means pass through the center of the piston land and connect to each of the U-shaped notches.

7. In a control valve having a spool reciprocable along its axis within a bore formed in the valve with the spool having a reduced diameter portion and an axially adjacent cylindrical land formed thereon for controlling communication of the reduced diameter portion with a port in the valve upon movement of the spool opposite axial directions, means forming an axially extending throttling slot in the land, the slot means extending radially along a flat radial surface portion of the land between the reduced diameter portion and the cylindrical surface of the land for metering out a fluid stream flowing from the reduced diameter portion to the port; and a cavity means having a first wall portion extending perpendicularly into the spool adjacent the flat radial surface portion of the land and having a second wall portion within the land axially spaced from the flat radial surface portion of the land and parallel to the first wall portion and extending inwardly and perpendicular to the axis of the spool, the first and second wall portions coinciding with the axial boundries of the slot means.

8. In a control valve having a spool reciprocable along its longitudinal axis within a bore formed in the valve with the spool having a reduced diameter portion and an axially adjacent land formed thereon for controlling fluid flow upon movement of the spool in opposite axial directions, a fluid pressure throttling means including a throttling slot formed in a radially extending flat surface portion of the land and having one end opening into a peripheral surface portion of the land and an opposite end extending to the reduced diameter portion, the throttling slot having a wall surface axially spaced remote from the reduced diameter portion and extending perpendicular with respect to the longitudinal axis of the spool;

a cavity means formed in the spool remote from and radially inwardly of the reduced diameter portion wherein a line perpendicular to the longitudinal axis of the spool and passing through the wall surface of the throttling slot also passes through a first radially extending wall portion of the cavity means, the cavity means having an axially opposite end most proximate the reduced diameter portion of the spool being further defined by a second radially extending wall portion perpendicular to the longitudinal axis of the spool, the first and second wall portions parallel to and respectively coinciding with the perpendicular wall surface of the throttling slot and the flat surface portion of the land.

9. The combination of claim 8, wherein two throttling slots and cavity means are provided one each at diametrical opposite points on the land and wherein the first and second wall portions of each cavity means form closed ended pockets on opposite sides of the longitudinal axis of the spool.

10. The combination of claim 8, wherein two throttling slots are provided one each at diametrical opposite points on the land and wherein the first and second wall portions of the cavity means extend to the two throttling slots through the longitudinal axis of the spool.

* * * * *